W. H. LOCKWOOD.
VENTILATING SHOW CASE.
No. 77,389.  Patented Apr. 28, 1868
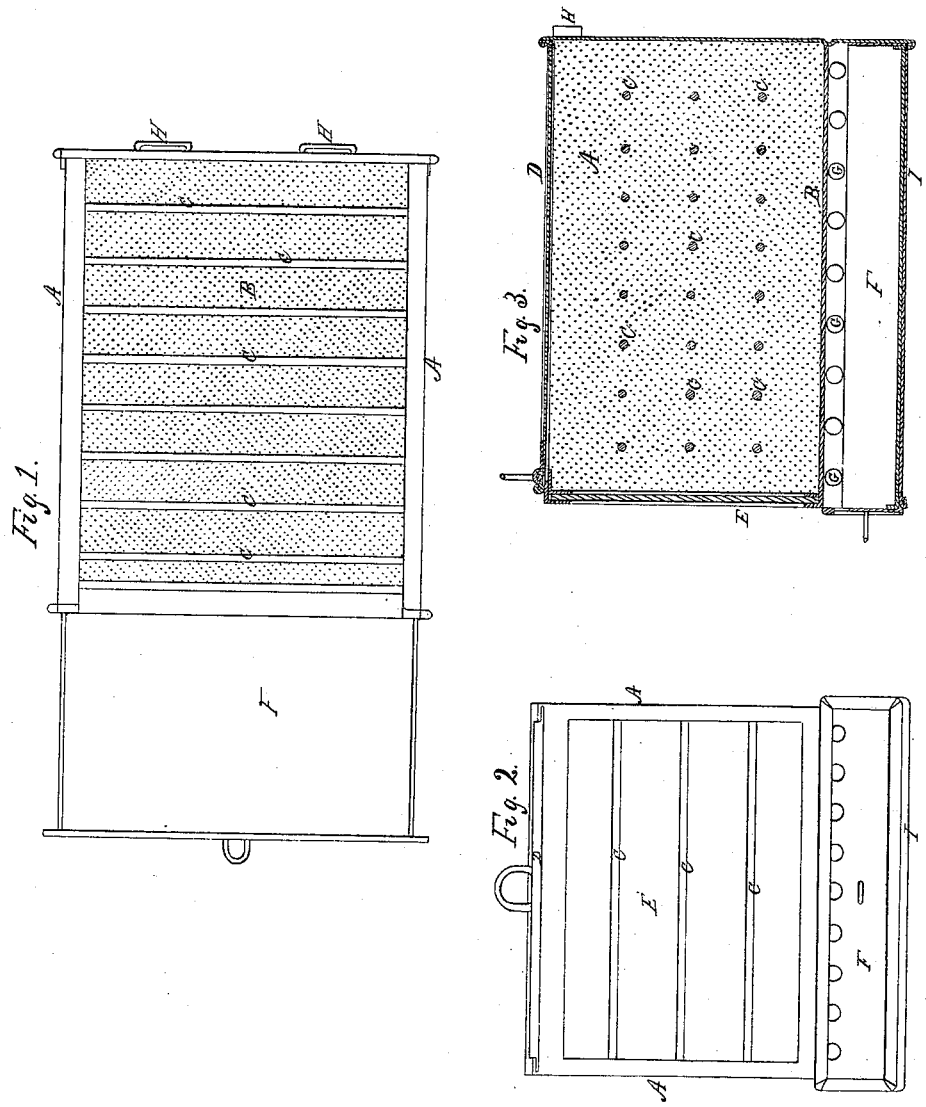

United States Patent Office.

WILLIAM HENRY LOCKWOOD, OF BROOKLYN, NEW YORK.

Letters Patent No. 77,389, dated April 28, 1868.

IMPROVED VENTILATING SHOW-CASE.

*The Schedule referred to in these Letters Patent and making part of the same.*

Be it known that I, WILLIAM HENRY LOCKWOOD, of the city of Brooklyn, county of Kings, and State of New York, have invented a new and improved Ventilating Show-Case for smoked or salted fish, &c.; and I do hereby declare that the following is a full, clear, and exact description thereof, which will enable others skilled in the arts to make and use the same, reference being had to the accompanying drawings.

The nature of my invention consists in providing a show-case, for smoked or salted fish, moist fruits, or grocery articles, with suitable means of ventilation, by perforations, or by constructing with wire gauze the sides and false bottom of the show-case; in supporting the fish or other articles upon their edges, and separating them by suitably-arranged and constructed divisions in the show-case that do not, to a considerable extent, conceal them from view; and in providing, in connection with such show-case, a drawer or sliding pan, to collect drippings.

In the accompanying drawings—

Figure 1 is a top view or plan of my invention, without the lid, and with the drawer partly open.

Figure 2 is a front elevation, and

Figure 3 is a longitudinal vertical central section of my invention.

Similar letters in each figure designate similar parts.

A A are the ventilating-walls or sides, and B the ventilating false bottom of the show-case; C C, the divisions attached to the side walls; in the drawings these are rods; D is the lid or top cover; E is the glass or transparent front; F is the drawer or sliding pan; G G are large ventilating-apertures, for the admission of air through the walls or sides below the false bottom B; H H are exterior attachments, to hold a placard; and I is the solid bottom of the show-case.

The operation of my invention is as follows: The fish or other articles intended for exhibition are placed vertically in the show-case, between the divisions C C, with their edges upon the false bottom B, and parallel with the glass or transparent front E. Any oil dripping from them passes through the perforation or ventilating openings of the false bottom B, and is caught by the sliding pan or drawer F, which can be removed and cleansed as occasion requires.

The advantages of my invention are many. The fish or other articles are protected from exposure to flies by the small size of the ventilating-apertures or interstices in the sides or walls. These sides or walls are made of perforated tin, wire gauze, or their equivalents, and are thereby rendered ventilating. If, as ordinarily, the fish, &c., exposed for sale, were in horizontal layers, the under ones would become soaked with drippings from the upper ones; thus the upper ones would become dry and insipid, and the under ones be rendered unfit for sale; but by my invention the separating-divisions C C (which might be of gauze or strips of tin as well as of rods, and might be fixed to the sides, or capable of sliding and removal therefrom,) hold the fish, &c., separate, so that no one drips upon another. In hot weather, more especially, it has been found that smoked fish, under ordinary exposure, either spoil within four days by mould, sweat, or flies, or, by too rapid drying, lose in weight, and also become insipid; whereas, by the use of my invention, they are protected from undue exposure, and kept in good condition during several weeks.

My invention further provides, by its glass or transparent front E, for the proper and advantageous exhibition of the fish, &c., while cleanliness is effectually obtained by their being kept separately enclosed, and their oil, &c., prevented from touching other articles on the counter where the show-case is placed.

What I claim as my invention, and desire to secure by Letters Patent, is—

1. The combination, in a show-case, of the ventilating-sides or walls A A, with the vertical partitions C C parallel to a transparent front, E, substantially as and for the purpose specified.

2. A false bottom, B, and a sliding pan, F, in combination with a show-case with ventilating-sides or walls A A and vertical partitions C C, substantially as herein described and specified.

W. H. LOCKWOOD.

Witnesses;
WM. C. WYCKOFF,
J. G. F. POWELL.